Sept. 22, 1959     P. H. KRAMER     2,905,278
SAFETY BRAKE CONSTRUCTION
Filed July 13, 1956     3 Sheets-Sheet 1
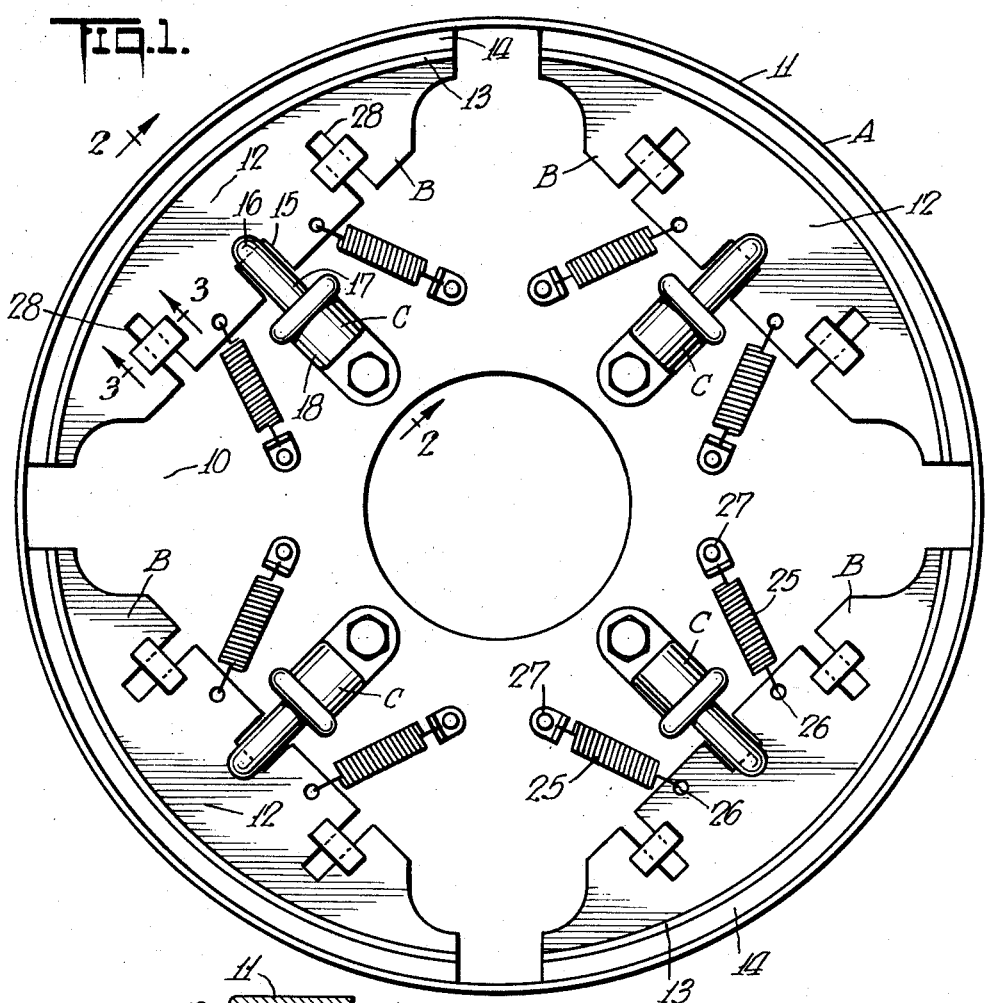
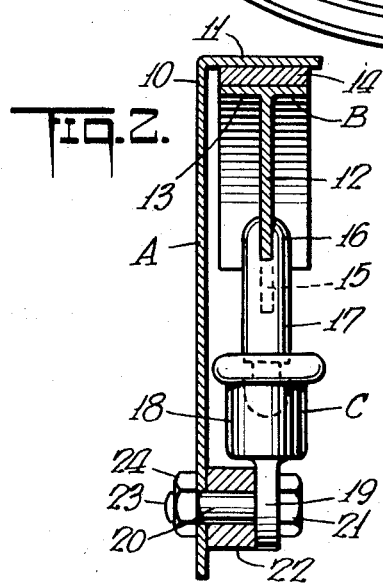
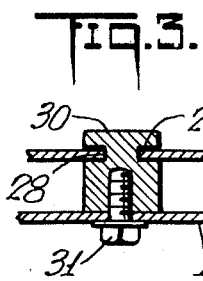
INVENTOR
Paul H. Kramer
BY
ATTORNEY

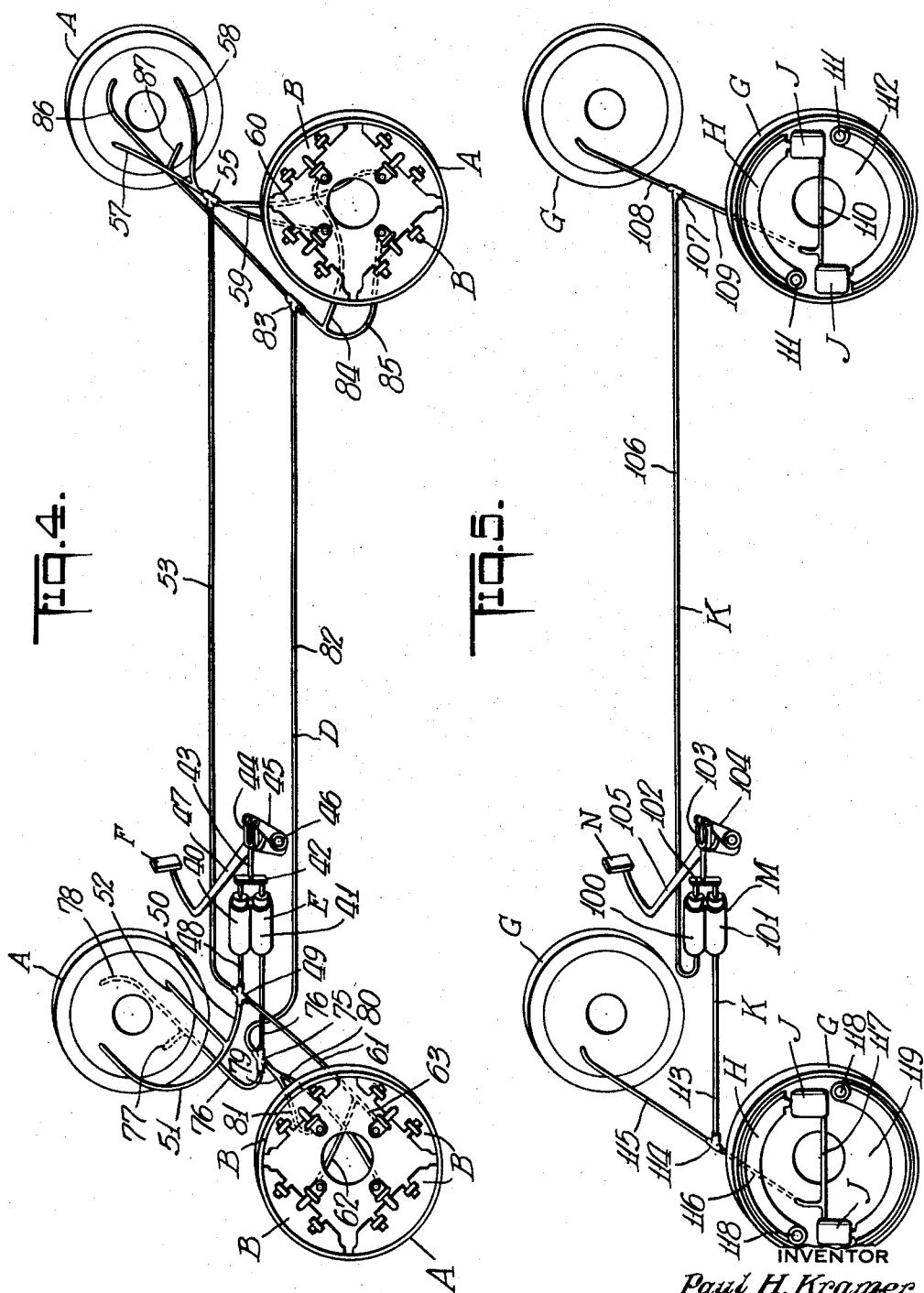

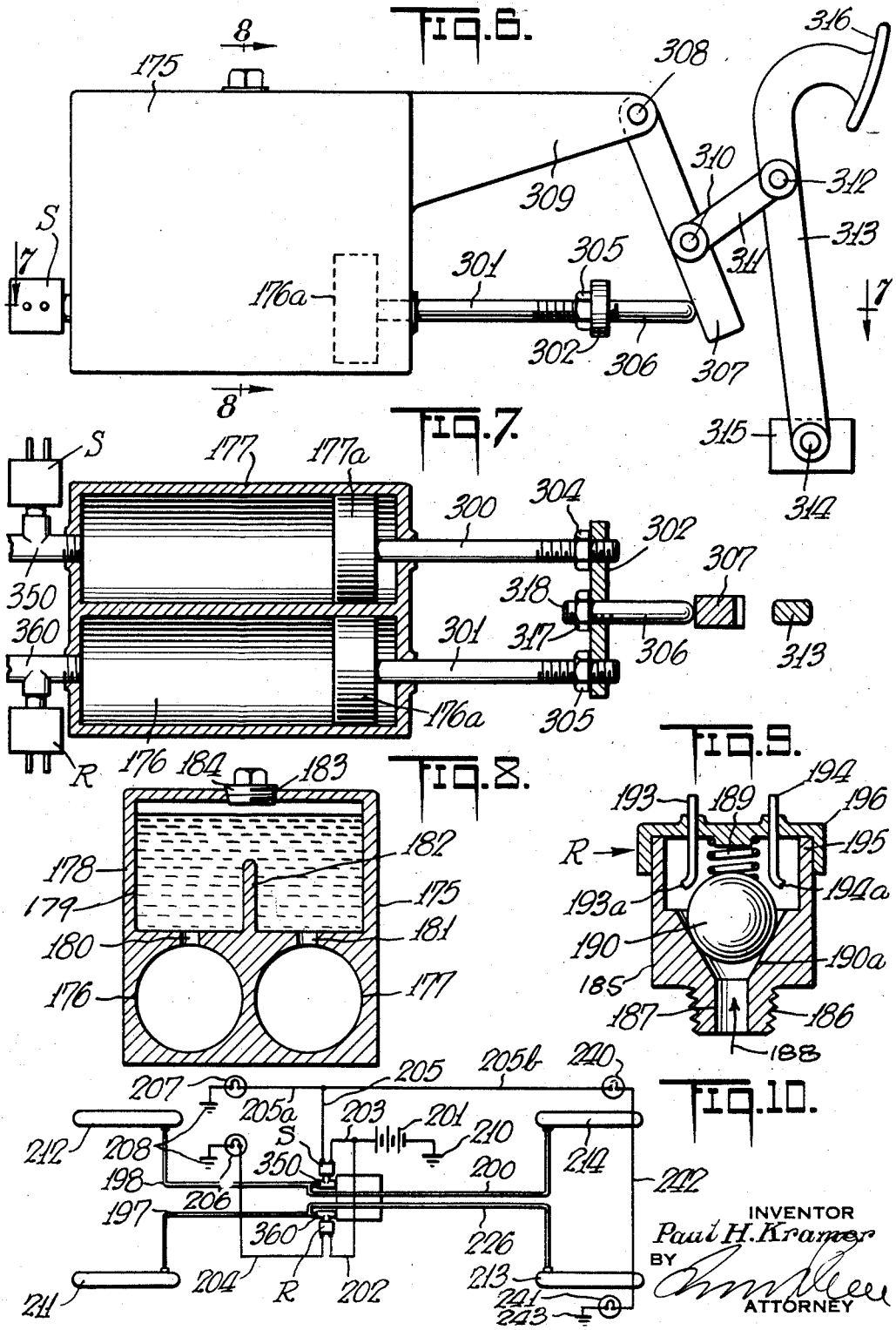

United States Patent Office 2,905,278
Patented Sept. 22, 1959

2,905,278

SAFETY BRAKE CONSTRUCTION

Paul H. Kramer, Mount Vernon, N.Y.

Application July 13, 1956, Serial No. 597,636

1 Claim. (Cl. 188—152)

The present invention relates to a safety brake construction, and it particularly relates to a safety brake construction for automotive vehicles.

It is among the objects of the present invention to provide a safety brake construction which will give more reliable brake operation over long periods of time, and which will assure a safety feature in case of breakdown of one or part of the brake transmitting mechanism.

Another object of the present invention is to provide a safety brake construction, particularly of the hydraulic brake type, in which assurance is had of reliable brake operation even though there may be failure in one cylinder and even though there may be failure in one or more of the shoes.

Still further objects and advantages will appear in the more detailed description set forth below, it being understood, however, that this more detailed description is given by way of illustration and explanation only, and not by way of limitation, since various changes therein may be made by those skilled in the art without departing from the scope and spirit of the present invention.

According to the preferred embodiment of the present invention a double hydraulic cylinder system is employed in which either or both cylinders may be effective in application of the brakes, and in which assurance is had that if one cylinder does not operate, the other cylinder or the remaining cylinder is effectively applying the brakes and will give the necessary braking action.

In one embodiment of the present invention one cylinder may be utilized to apply one set of brakes while the other cylinder may be utilized to apply the other set of brakes.

In furtherance of the safety feature a plurality of brake shoes are usually provided with each braking cylinder on each wheel.

In one form of the invention 4 shoes are provided, 2 shoes being actuated by one cylinder, and the other 2 shoes being operated by the other cylinder.

If desired the shoes on the rear wheels may be actuated by one cylinder while the shoes on the front wheels are actuated by the other hydraulic master cylinder.

This same short of arrangement may be applied to wheels having 2 shoes, 3 shoes or even a larger number of shoes than 4 shoes.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Fig. 1 is a front elevational plan view of one form of wheel cylinder with associated brake shoes.

Fig. 2 is a fragmentary transverse sectional view upon the line 2—2 of Fig. 1, upon an enlarged scale as compared to Fig. 1.

Fig. 3 is a fragmentary transverse sectional view upon the line 3—3 of Fig. 1 upon an enlarged scale as compared to Fig. 1.

Fig. 4 is a diagrammatic layout of a 4 shoe double master cylinder hydraulic brake system with alternate shoes in each wheel being actuated by alternate master cylinder.

Fig. 5 is a diagrammatic layout view of still another hydraulic arrangement in which each hydraulic master cylinder operates separate wheels, one master cylinder operating the two front brakes and the other master cylinder operating the rear wheel brakes with 2 shoe wheel brakes being shown.

Fig. 6 is a side elevational view illustrating in large scale a double master cylinder construction.

Fig. 7 is a transverse longitudinal sectional view upon the line 7—7 of Fig. 6.

Fig. 8 is a transverse sectional view, illustrating a double master cylinder construction together with a split supply chamber of extra fluid which will assure that each cylinder has an independent fluid supply, upon the line 8—8 of Fig. 6.

Fig. 9 is a fragmentary transverse sectional view of a signal device which may be placed in the feed line from each master cylinder to give an indication that such master cylinder is properly functioning.

Fig. 10 is a diagrammatic layout view illustrating the location of the electrical switch devices of Fig. 9 in the conduits leading from the respective master cylinders to the brakes at the various wheels.

Referring to Fig. 1 there is shown the individual wheel brake cylinder A having 4 brake shoes B each one occupying about 90° of the circumference. Each of these brake shoes B are associated with an actuating wheel cylinder C.

Referring to Fig. 4 the actuating piston cylinder combinations at the wheels are connected by piping D to the double master cylinder E, which is actuated by the brake pedal F.

In the arrangement shown in Fig. 5 the wheel braking cylinders G are each provided with opposite pairs of shoes H which are actuated by the wheel cylinder piston combinations J.

Operating the wheel piston cylinder combinations J through the tubing K is the double master cylinder combination M which is operated by the foot pedal N.

Referring to Figs. 1, 2 and 3, the braking of individual wheel cylinders A, having back plate 10 and a cylindrical flange 11 which affords the actual braking surface, each shoe B is of arcuate shape and it has a central web 12 with an end flange 13.

The end flange 13 carries the friction braking surface 14.

Each of the shoes B has a central slot 15 which receives the end connection 16 from the piston 17 which extends into the cup 18 of the actuating wheel cylinder piston combinations.

Each cup 18 has an integral projecting eye 19 which is pivotally mounted on the stud 20. The stud 20 has a head 21 and spaces the eye 19 by means of the sleeve 22.

The threaded end 23 of the stud 20 extends through the back plate 10 and is held in position by the nut 24.

Each of the shoes B are normally retracted from contact position with the flange 11 by means of the springs 25. These springs 25 obliquely extend from the attachment points 26 to the mounting points 27 on the back plate 10.

Each of the shoes are also provided with guide slots 28 which fit into the recessed portions 29 on the guide studs 30. The guide studs 30, each of which are used for each shoe B, are provided with bolts 31 which hold them in position on the back plate 10 (see Fig. 3).

Referring to Fig. 4 an arrangement is shown by which each opposite pair of shoes B are provided with actuating connections to alternate members of a double master cylinder arrangement.

As shown in Fig. 4 the master cylinder combination E has an upper cylinder 40 and a lower cylinder 41. These cylinders may also be arranged side by side. Each of these cylinders are operated simultaneously by the yoke 42 and the rod 43.

The rod 43 is connected to the buckle 44 which is mounted upon the short lever 45. The short lever 45 is mounted upon the pivotal structure 46 and it is operated through the extension 47 of the foot pedal or brake pedal F.

From the master cylinder 40 the conduit leads at 48 to the junction at 49. From the junction at 49 there is one line 50 with branches at 51 and 52 which lead to opposite brake shoes B of each set of 4, as indicated at the lower left of Fig. 4.

From the junction 49 also extends the lines 53 to the junction 55 which in turn has connections at 57 and 58 at one wheel and 59 and 60 at the other wheel to opposite brake shoes B.

The other lower left set of shoes are operated from the header 61 which has connections at 62 and 63 to opposite brake shoes B.

The lower cylinder 41 has a similar system from the junction 75 which is connected by means of the pipe 76 to said master cylinder 41.

The junction 75 has connections 76 which branch at 77 and 78 to one set of opposite shoes B, and it has another connection 79 which branches at 80 and 81 to the other set of shoes B.

From the junction 75 there also leads the connection 82 to a rear junction 83 which has branch lines 84 and 85 to one side, and 86 and 87 to the other side.

It is thus apparent that by movement or operation of the pedal F each cylinder 40 and 41 will control 2 opposite brake shoes B in each wheel.

If one of the cylinders 40 and 41 is not operating the other cylinder will operate at least one pair of the brake shoes B at each wheel, giving adequate braking power.

Assurance is therefore had of additional safety protection in case of any breakage or stoppage of one of the master cylinders, enabling repairs to be obtained when the vehicle is driven to a service station, without losing all braking power.

In the alternative arrangement shown in Fig. 5 the upper and lower cylinders 100 and 101 are similarly actuated by means of a harness 102, a buckle 103, a lever 104 and the arm 105 of the foot pedal N.

The upper cylinder has a conduit 106 which leads to a junction 107 having the leads 108 and 109 to the cross conduits 110 at each wheel.

Each cross conduit 110 operates one of the wheel cylinder piston combinations J which in turn operates the opposite shoes H, which are pivotally mounted as indicated at 111 on the back plate 112.

The other master wheel cylinder 101 has a conduit 113 leading to the junction 114 which has the branch conduits 115 and 116 leading to the crossed conduits 117.

Each crossed conduit 117 operates 2 wheel cylinders J which actuates the opposite shoes H pivotally mounted at 118 on the back plate 119.

In the arrangement shown in Fig. 5 each master cylinder 100 and 101 operates different wheels with the front wheels being operated by one master cylinder and the rear wheels being operated by the other master cylinder.

Therefore, if there is a break in one of the master cylinders 100 and 101 or in the conduits 106 or 113, braking effect will still be possible and sufficient braking power will be had by the residual effective brakes.

Referring to Figs. 6 to 8, there is shown a double master cylinder construction 175 having the cylinders 176 and 177 with the portions 176a and 177a, which are fed with liquid from the reserve pools 178 and 179.

Suitable valves may be placed at positions 180 and 181 to provide a passage of extra fluid from the pools 178 and 179 respectively to the cylinders 176 and 177 when extra fluid is required.

It will be noted that the partition 182 separates the pools 178 and 179 so that there will be a separate reserve supply for each cylinder 176 and 177.

The filling opening 183 normally receives the filling plug 184 which when removed permits an additional supply of brake fluid to be poured into the reserve pools or reservoirs 178 and 179.

It is also desirable to have signal switches R and S (see Fig. 9) which will indicate when each of the cylinders 176 and 177 are operating properly.

The signal valves R and S consist of a body 185 which has a threaded end connection 186 and an outlet passage 187.

The liquid flow as indicated at 188 will press the ball 190 from the seat 190a so as to cause closure of the conductors 193 and 194 at the contact ends 193a and 194a.

The ball 190 is pressed against seat 190a by the spring 189.

The external connections 193 and 194 extend through cap 196 which closes the chamber 195 receiving the reciprocatory ball 190.

The removal of cap 196 will enable access to the chamber 195 and replacement of ball 190 and spring 189.

As indicated in Fig. 10, two valves R and S are provided, one for each of the master cylinders 176 and 177 of Figs. 6 to 8.

Each of these devices R and S will be mounted on the T conduit sections 350 and 360 (see Fig. 7). The T connections 350 and 360 will feed the lines 197 to the front and 226 to the rear at the left side for cylinder 176 and the lines 198 to the front and 200 to the rear for the right cylinder 177. The devices R and S will also be connected to the battery 201 by the electrical connections 202 and 203.

The other connections from the device S will be connected as indicated at 205, 205a and 205b to the signal lights 240, 241 at the rear, and the light 207 on the dashboard. From the switch R the electrical connections will be at 204 to the dashboard light 206 to ground 208.

The other connections will be to the ground or chassis frame as indicated at 243 in connection with the rear lights 240 and 241 and the ground connection with the other side of the battery as indicated at 210.

The pedal 313 is pivotally mounted at 314 on structure 315 with foot contact 316. The link 311 connected at 310 and 312 operates the lever 307 mounted on bracket 309 at 308. The lever 307 will move the push rod 306 with the cross bar 302. The cross bar carries the rods 300 and 301 by the adjustable threaded nuts 304 and 305.

Referring specifically to Fig. 9, the entire automobile layout is indicated with the tires or wheels 211, 212, 213 and 214 indicating how the signal arrangement of the present invention may be readily assembled with the automobile structure.

It is thus apparent that the applicant has provided a safer braking arrangement particularly adapted for hydraulic brakes in which by means of a double master cylinder, with each master cylinder operating its own brake shoes or wheels, a better safety factor is introduced with assurance that disabling of one brake system or one master brake cylinder will not disable the operation of the braking system and will leave sufficient braking power.

While there has been herein illustrated and described the preferred embodiment of the invention, it is to be understood that applicant does not limit himself to the precise construction herein disclosed, and the right is reserved to all changes and modifications coming within the scope of the invention as defined in the appended claim.

Having now particularly described and ascertained the nature of the invention, and in what manner the same is to be performed, what is claimed is:

A safety brake system for a four-wheeled automotive vehicle of the type having a cylindrical brake drum at each wheel and four brake shoes in each drum, each shoe covering about 90° of the circumferential surface and each shoe having a central radially disposed actuating piston rod and cylinder, a cylinder block having double cylinder arrangement with the cylinders arranged in side-by-side relationship and with a reservoir above the cylinders supplying brake fluid to each of the cylinders with a central partition extending between the cylinders, outlet connections from each of the cylinders to opposite pairs of brake shoes at each wheel, each cylinder operating one opposite pair of shoes at each wheel, pistons in each cylinder and a yoke provided with a foot pedal to actuate both pistons simultaneously, each of said outlet connections from said cylinders having a signal valve comprising a body having a seat, a spring pressed ball in said seat and a pair of electrical contacts in said body and spaced from said ball, said ball being forced against said electrical contacts to close a circuit by the pressure of the brake fluid when said pistons are activated, and forced into said seat by said spring when the pistons return to inoperative position.

References Cited in the file of this patent

UNITED STATES PATENTS

| | | |
|---|---|---|
| 2,197,292 | Brady | Apr. 16, 1940 |
| 2,332,301 | Cox | Oct. 19, 1943 |
| 2,375,415 | Hollowell et al. | May 8, 1945 |
| 2,518,411 | Wilson | Aug. 8, 1950 |
| 2,694,191 | Falanga et al. | Nov. 9, 1954 |